Figure 1:
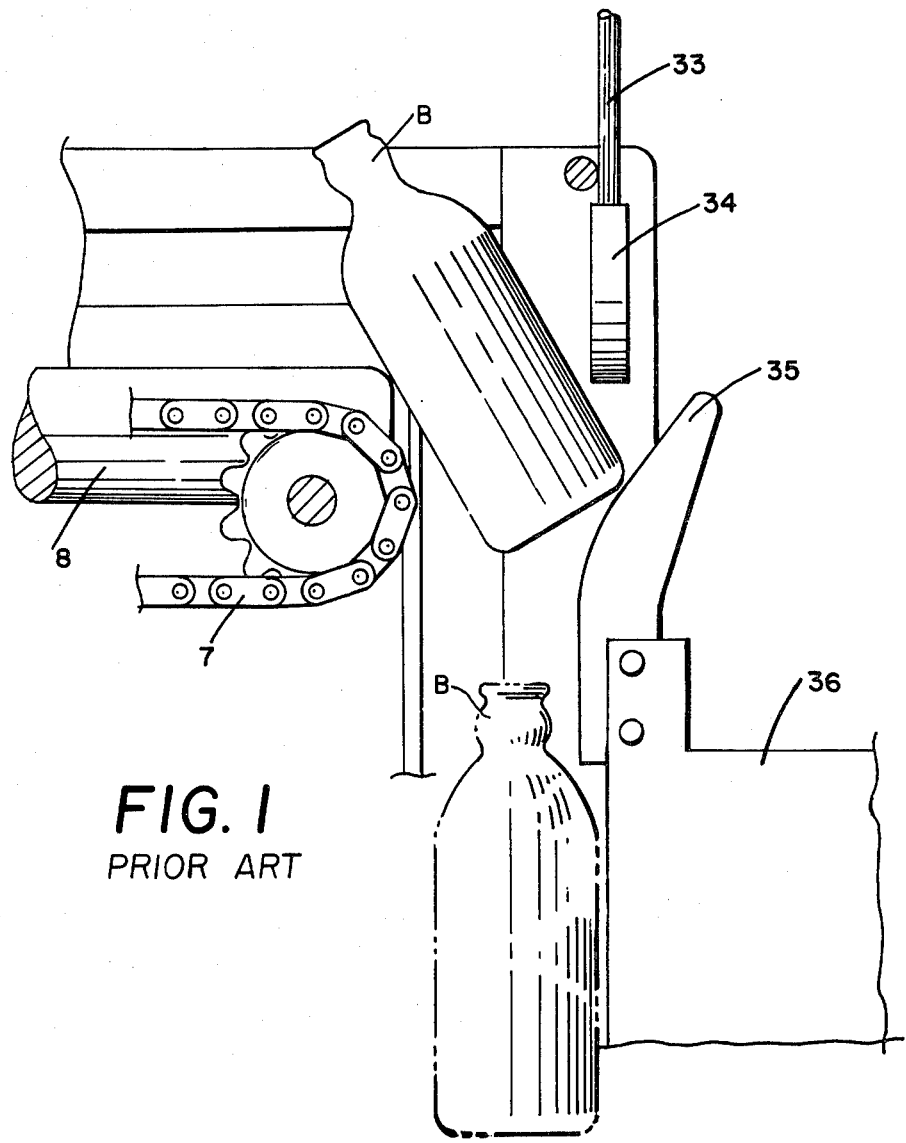

United States Patent [19]

Graham et al.

[11] 4,213,526
[45] Jul. 22, 1980

[54] APPARATUS FOR UNSCRAMBLING AND ERECTING A PLURALITY OF NON-VERTICAL BOTTLES

[75] Inventors: Robert H. Graham, Spokane; Barry D. Campbell, Nine Mile Falls, both of Wash.

[73] Assignee: The Molson Companies Limited, Rexdale, Canada

[21] Appl. No.: 918,086

[22] Filed: Jun. 22, 1978

[51] Int. Cl.² ............................................. B65G 47/24
[52] U.S. Cl. ................................... 198/400; 198/407; 198/408; 198/481
[58] Field of Search ............... 198/408, 480, 481, 400, 198/482, 457–458, 441, 450, 407; 221/171–172

[56] References Cited

U.S. PATENT DOCUMENTS 3,894,628   7/1975   Pugh et al. ........................... 198/407

FOREIGN PATENT DOCUMENTS 990825   5/1965   United Kingdom ..................... 198/408

Primary Examiner—Robert B. Reeves
Assistant Examiner—Douglas D. Watts
Attorney, Agent, or Firm—Anthony J. Casella

[57] ABSTRACT

An apparatus for unscrambling and erecting a plurality of non-vertical bottles includes a rotatable toothed cam wheel onto which bottles are dropped in an untimed sequence from a first conveyor table. The bottles are then conveyed by the rotatable toothed cam wheel in an erected condition to a second conveying table, with the alternate teeth of the toothed cam wheel simultaneously and directly urging the erected bottles from their stalls.

2 Claims, 6 Drawing Figures

APPARATUS FOR UNSCRAMBLING AND ERECTING A PLURALITY OF NON-VERTICAL BOTTLES

The invention relates to an improvement in apparatus for unscrambling and erecting a plurality of non-vertical bottles, such apparatus being described and illustrated in U.S. Pat. No. 3,894,628 which issued to The Molson Companies Limited on July 15th, 1975, hereinafter being termed "the basic apparatus".

In the basic apparatus, non-vertical bottles are conveyed in paths along a table to a bottle erecting station located at its terminal end where, if they have been presented thereto neck-first, pivotal means support the necks until the bottles fall by gravity bottom-first into a plurality of bottle stalls located at a lower level than the table. Obviously, if the bottles are presented to the bottle-erecting station bottom-first, the pivotal neck support means are not required to operate. When the bottles have dropped into the bottle stalls, they have then been conveyed from said stalls to other apparatus, e.g. bottle sterilizing apparatus, by means of chain conveyors or belt conveyors or a combination of both said type of conveyor. However, from time to time, the transfer of the bottles on to such conveyors has not proved too satisfactory for one reason or another.

Hence, it is an object of the present invention to provide simple and relatively inexpensive means which will overcome the above disadvantages.

Accordingly, the present invention relates to apparatus for unscrambling and erecting a plurality of non-vertical bottles including a conveying table, a bottle erecting station located adjacent the terminal end of the conveying table and a plurality of bottle stalls at a lower level than said terminal end, the improvement comprising means located at each said stall for positively urging the bottles therefrom as they drop from said table.

Figure 2:
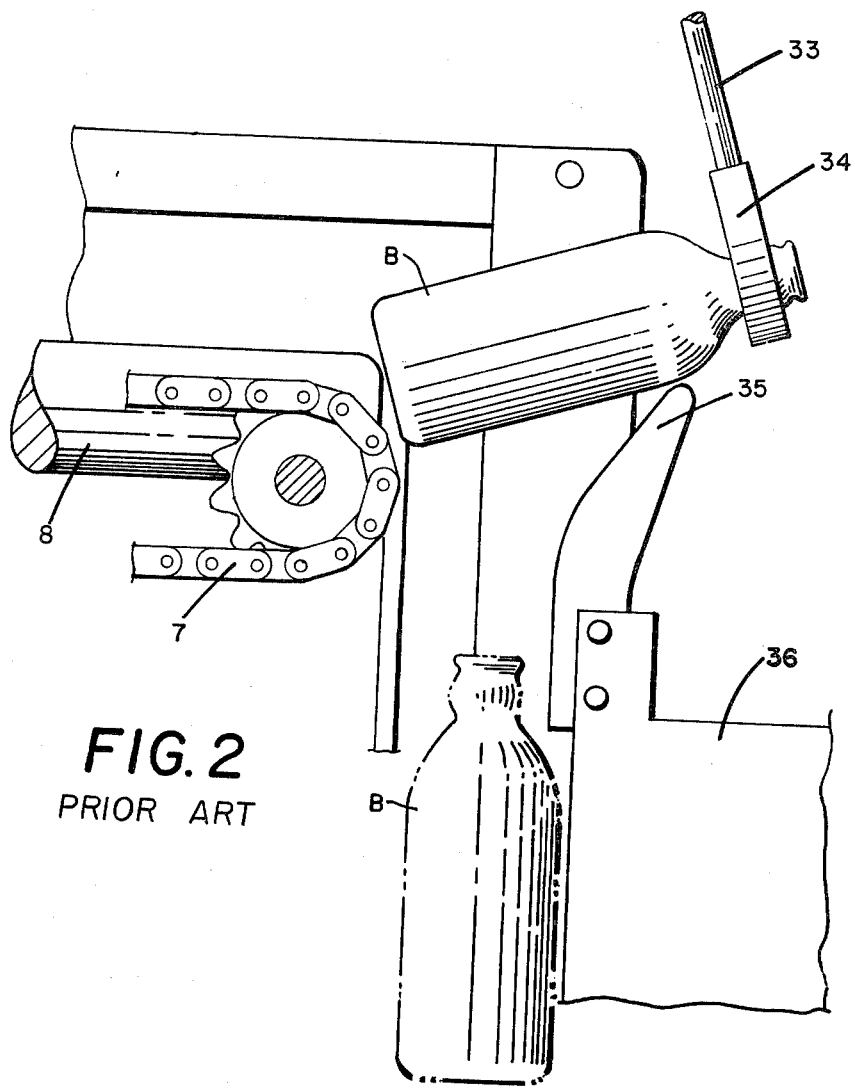
Figure 3:
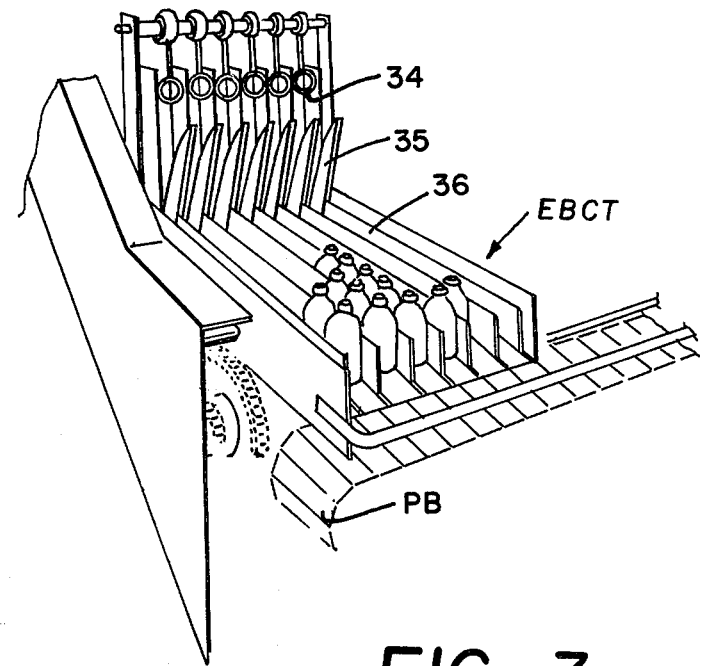
Figure 4:
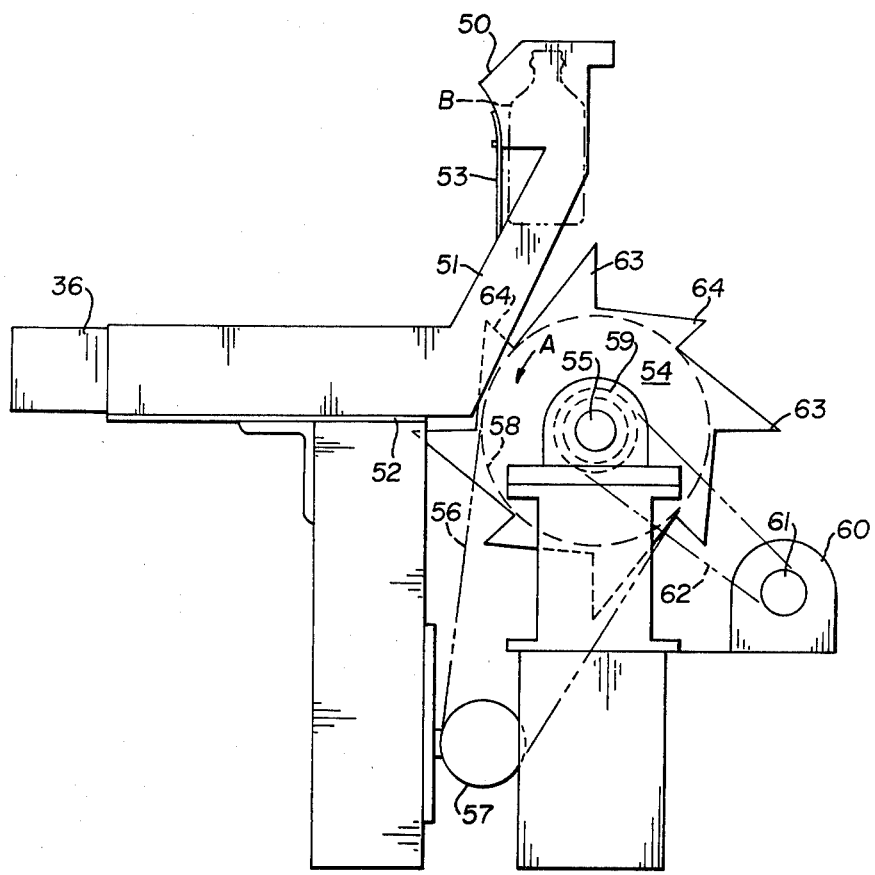
Figure 5:
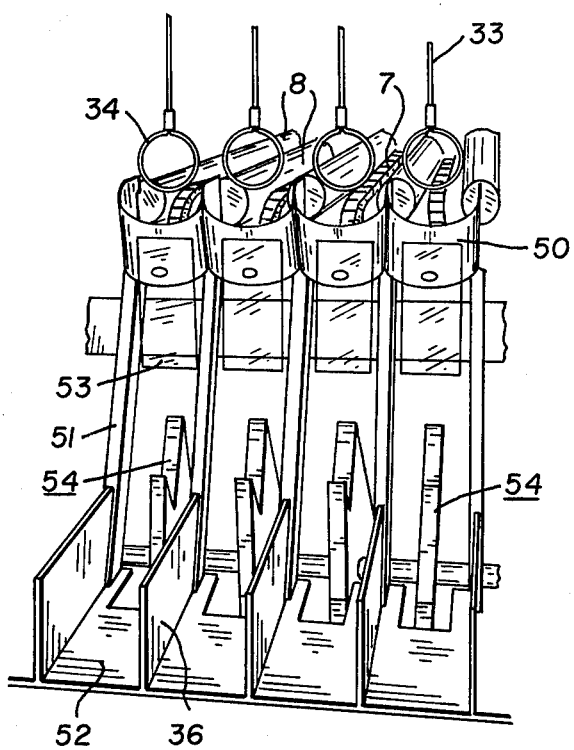
Figure 6:
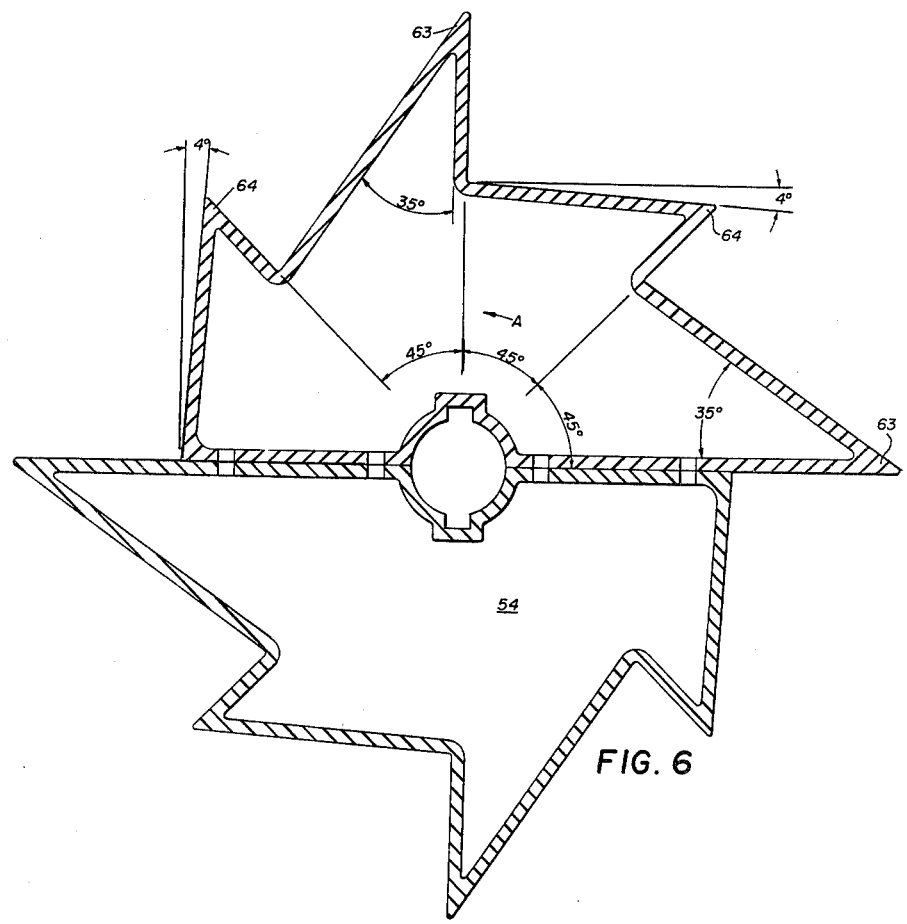

The invention is illustrated, by way of example, in the accompanying drawings in which:

FIGS. 1–3 (entitled "Prior Art") are detail views of the abovementioned basic apparatus; and FIGS. 4–6 are detail views of the present invention.

In order to appreciate the present invention, it is first necessary to understand, in broad terms, the principle of the basic apparatus and, in this regard, reference should be made to FIGS. 1 to 3. In FIG. 1, empty bottles B have been conveyed, (bottom first) along a first conveying table, and between adjacent pairs of counter-rotating rollers 8, by means of chain conveyors 7, to the distal end of said table. In falling from the latter, they have each struck an angulated finger 35 each of which is secured to a guide or divider plate 36 extending from its associated bottle stall to the distal end of a further conveying table, termed an erect bottle conveying table EBCT which eventually leads to a plate belt PB (see FIG. 3) for transportation to a bottle sterilizer (not shown). The fingers 35 serve the dual purpose of guiding the bottles into the stalls as well as braking the speed of their fall.

In FIG. 2, the empty bottles B have been urged to the distal end of the first conveying table neck-first where the neck of each bottle passes into an associated collar 34 located at the lower end of a spindle 33 capable of pivotal movement. Continued forward movement of such a captured bottle enables the shoulders on the latter to contact the collar causing the spindle 33 to pivot away from said distal end of the table while the collar still supports the neck of the bottle until the centre of gravity of the bottle passes beyond said terminal edge whereupon the bottle falls, bottom first, from the table into its stall striking its associated finger 35 as it does.

It is quite normal for other than unbroken bottles to pass along the first conveying table such as, e.g. broken bottles and foreign matter. Obviously when such articles reach the distal end of the table, they drop into the bottle stalls and impede the downward path of the next whole and succeeding bottle. This has resulted in jamming of the machine which must then be stopped to enable the blocked stall to be cleared. The present invention overcomes this difficulty and reference should now be made to FIGS. 4–6 of the accompanying drawings. In FIGS. 4 and 5, the fingers 35 of the basic apparatus have been replaced by a plurality of interconnected arcuate drop-tube elbows 50 which are connected to the divider plates 36 by means of angulated connecting plates 51, the plates 36 being welded at their lower edges to a slotted dead plate 52. Flexible bottle drop flappers 53 are each secured at their upper ends to an associated elbow 50 and serve as an additional means of braking the speed of the fall of the bottles.

Located in each bottle stall is toothed star or cam wheel indicated generally at 54 and each of the latter is mounted on a transverse drive shaft 55. The shaft 55 is driven from a hydraulic motor (not shown) by means of a chain drive 56 and sprockets 57, 58 with the latter being mounted on shaft 55. A smaller sprocket wheel 59 is also mounted on the shaft 55 and is connected to a speed switch 60 by means of another sprocket 61 and chain drive 62.

It will be noted from FIG. 4 that alternate teeth 63 of each cam wheel 54 are radially longer than the intermediate teeth 64 and the longer face of each of the latter is slightly angulated beyond 90 degrees in relation to the shorter and adjacent face of the next tooth 63 so as, preferably, to present an angle of 94° to the vertical. The shorter faces of both types of teeth 63,64 are each disposed at an angle of 45° with respect to the centre of the axis of rotation of the wheel 54. Moreover, the shorter face of each tooth 63 is arranged at an angle 35° to its associated longer face. Each cam wheel 54 is moulded from high density polyethylene.

In operation, as a bottle drops from the first conveying table into a stall, the arcuate elbow 50 guides it in its downward fall, as does each flapper 53. The bottle then lands with its bottom substantially on the shorter face of a tooth 64 so that as the cam wheel continues to rotate in the direction of arrow A, the longer face of the next succeeding tooth 63 urges the bottle out of its stall and on to the dead plate 52 until succeeding bottles push the first bottles on to the plate belt PB which then conveys it to the sterilizer. Any large pieces of broken glass or foreign matter dropping into the stalls will be ejected therefrom in the same manner.

We claim:

1. In apparatus for unscrambling and erecting a plurality of non-vertical bottles including a conveying table, a bottle erecting station located adjacent the terminal end of the conveying table, a plurality of bottle stalls at a lower level than said terminal end, pivotal bottle support means located at said station and struck by the bottoms of non-vertical bottles presented bottom-first to said terminal end and which support means are thereby pivoted out of the path of travel of such bottles to enable the latter to fall bottoms-first from said end, said pivotal means also serving to support the necks of non-vertical bottles presented neck first to said terminal end until said last-mentioned bottles fall bottoms-first from said terminal end, and guide means at said station struck by said falling bottles which thereby guide the latter in an erect condition into said stalls, the improvement wherein said guide means include a plurality of arcuate drop-tube elbows of double curvature including an enlarged mouth portion, said elbows being disposed at the terminal end of the conveying table for directing the bottles from the latter into stalls, each stall including a slotted plate onto which the bottles are deposited, and a rotatable toothed cam wheel disposed in the slot of the slotted plate located at each said stall and onto which the bottles drop in a vertical position as well as in an untimed sequence from said table, alternate teeth of each said wheel being longer than intermediate teeth and serving simultaneously and directly to urge the bottles from the stalls.

2. In an apparatus for unscrambling and erecting a plurality of non-vertical bottles according to claim 1 wherein each of the teeth of said wheel has first and second faces, the latter being shorter than the former, the longer face of each of said intermediate teeth presenting an angle of 94° to the vertical so as to present, together with the following shorter face, a relatively large pocket to receive a said bottle.

* * * * *